United States Patent [19]
Ohuchi et al.

[11] Patent Number: 5,825,937
[45] Date of Patent: Oct. 20, 1998

[54] SPATIAL-FILTERING UNIT FOR PERFORMING ADAPTIVE EDGE-ENHANCEMENT PROCESS

[75] Inventors: Satoshi Ohuchi, Hachioji; Sadao Takahashi, Yokohama, both of Japan

[73] Assignee: Ricoh Company, Ltd., Japan

[21] Appl. No.: 826,003

[22] Filed: Mar. 27, 1997

Related U.S. Application Data

[63] Continuation of Ser. No. 616,775, Mar. 15, 1996, abandoned, which is a continuation of Ser. No. 310,078, Sep. 22, 1994, abandoned.

[30] Foreign Application Priority Data

Sep. 27, 1993 [JP] Japan ................................ 5-239559

[51] Int. Cl.$^6$ ........................................................ G06K 9/00
[52] U.S. Cl. ........................................ 382/261; 382/263
[58] Field of Search .................................... 382/275, 299, 382/300, 301, 309, 310, 254, 255, 256, 257, 258, 259, 260, 261, 262, 263, 264, 265, 266, 267, 268, 269, 270, 271, 272, 273, 274, 282, 283, 307, 308, 190, 168, 173, 167; 358/455, 466, 443, 447, 456, 465, 457, 462, 464; 347/15, 3; 348/607, 625

[56] References Cited

U.S. PATENT DOCUMENTS

| | | | |
|---|---|---|---|
| 3,964,021 | 6/1976 | Tamches | 382/262 |
| 4,213,150 | 7/1980 | Robinson et al. | 358/166 |
| 4,268,861 | 5/1981 | Schreiber et al. | 358/138 |
| 4,554,593 | 11/1985 | Fox et al. | 382/176 |
| 4,783,840 | 11/1988 | Song | 382/261 |
| 5,001,767 | 3/1991 | Yoneda et al. | 382/50 |
| 5,018,024 | 5/1991 | Tanioka | 382/176 |
| 5,020,119 | 5/1991 | Tai et al. | 382/50 |
| 5,022,091 | 6/1991 | Carlson | 382/261 |
| 5,050,226 | 9/1991 | Collet-Billon | 382/261 |
| 5,081,692 | 1/1992 | Kwon et al. | 382/261 |
| 5,339,365 | 8/1994 | Kawai et al. | 382/54 |
| 5,343,309 | 8/1994 | Roetling | 358/455 |

FOREIGN PATENT DOCUMENTS

| | | | |
|---|---|---|---|
| A-415 648 A2 | 6/1981 | European Pat. Off. | G06F 15/66 |
| A-318 950 A2 | 7/1989 | European Pat. Off. | G06F 15/68 |
| 61-157162 | 7/1986 | Japan | H04N 1/40 |
| 3-88478 | 4/1991 | Japan | H04N 1/40 |
| 6-131455 | 5/1994 | Japan | G06F 15/68 |

OTHER PUBLICATIONS

"High Quality Digital Image Processing Method using Moire Suppression and Edge Enhancement Filtering", 1992 Image–Electronics–Society annual–meeting previous paper 40, pp. 183–186, Fig. 1. No Author. No Place of Publication.

Segmentation Method for Documents Containing Text/Picture, proposed by the present applicant, Electronics Information Communication Society Paper Journal vol. J75–DI1 No. 1, pp. 39–47, Jan. 1992. No Author Name.

"Fineness Processing Technology", written by Jo Suzuki, pp. 107–139 of a publication Color Hardcopy Image Processing Technology, Triceps WS 114, published by Ken Sawauchi, Triceps, Inc., on May 25, 1990, printed by Showa Printing Company.

*Primary Examiner*—Leo H. Boudreau
*Assistant Examiner*—Bijan Tadayon
*Attorney, Agent, or Firm*—Knoble & Yoshida LLC

[57] ABSTRACT

A spatial-filter which includes a first filtering unit which performs a smoothing process on image data, the smoothing process being a process by which tone oscillations formed by tone levels are suppressed. A second filtering unit performs an adaptive edge-enhancement process on the image data which has previously undergone the smoothing process. The adaptive edge-enhancement process is a process by which sharpness of edges is enhanced, the edges being parts having parts tone gradients in the image. The manner of the adaptive edge-enhancement process depends on edge amounts present in the input image data. The edge amounts are amounts indicating how steep tone gradients of the tone levels represented by the image data are.

12 Claims, 7 Drawing Sheets

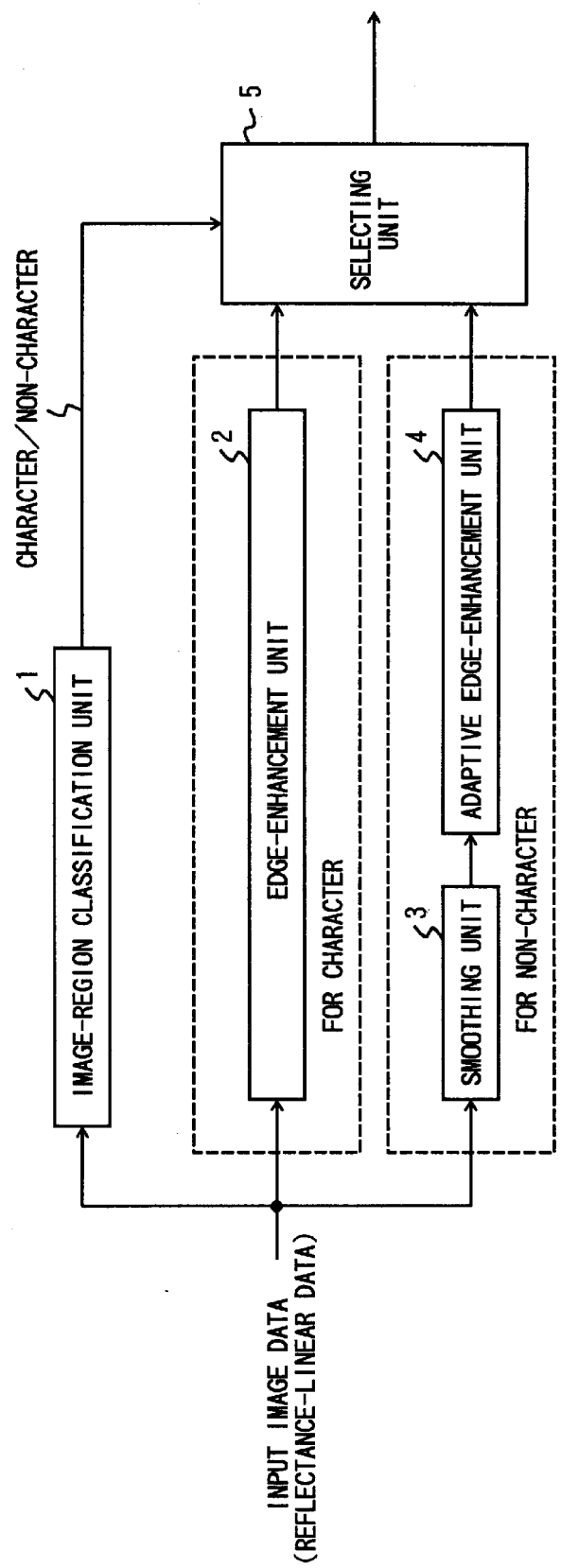

FIG. 3

$$\frac{1}{8} \times \begin{array}{|c|c|c|c|c|} \hline 0 & 0 & -4 & 0 & 0 \\ \hline -1 & -3 & 24 & -3 & -1 \\ \hline 0 & 0 & -4 & 0 & 0 \\ \hline \end{array}$$

REFLECTANCE-LINEAR
SIGNAL

DENSITY-LINEAR SIGNAL $$f\left(Max\left(\begin{array}{|ccccc|} 1&1&1&1&1\\ 1&1&1&1&1\\ 0&0&0&0&0\\ -1&-1&-1&-1&-1\\ -1&-1&-1&-1&-1 \end{array}\right|\cdot I\right|, \left|\begin{array}{|ccccc|} 1&1&0&-1&-1\\ 1&1&0&-1&-1\\ 1&1&0&-1&-1\\ 1&1&0&-1&-1\\ 1&1&0&-1&-1 \end{array}\right|\cdot I\right|\right)\right)$$

5,825,937

SPATIAL-FILTERING UNIT FOR PERFORMING ADAPTIVE EDGE-ENHANCEMENT PROCESS

This is a continuation, of application Ser. No. 08/616,775, filed Mar. 15, 1996, now abandoned, which was a continuation of application Ser. No. 08/310,078, filed Sep. 22, 1994, now abandoned.

BACKGROUND OF THE INVENTION

1. Field of the Invention

The present invention relates to a spatial-filtering unit used in an image processing apparatus and in particular to a spatial-filtering unit for improving image quality.

2. Prior Art

An original image to be processed through a digital duplicator, a facsimile apparatus and so forth may be generally classified into three categories of images, character images, photograph images, and halftone-printed images. These categories of images have particular properties so that different manners are required to be used in processing these categories of images so as to improve image quality in copies obtained from the categories of original images. For the above purpose, if one original image includes at least two of the above three categories of image parts, an image-region classification process is first performed so as to classify the original image into regions consisting of the two categories of image parts. After that, processes appropriate to the categories of image parts are performed on the classified regions.

Various methods of such an image-region classification process have been proposed in, for example, the following papers: 'High Quality Digital Image Processing Method using Moire Suppression and Edge-Enhancement Filtering', 1992, Image-Electronics-Society annual-meeting previous paper 40, pages 183–186, FIG. 1 (Paper 1); and 'Image-Region Classification Method for Character/Picture (halftone, photograph) Mixed Image', proposed by the present applicant, Electronics Information Communication Society Paper Journal Vol. J75-DI1 No.1, pages 39–47, January 1992 (Paper 2).

Problems such as those described below are present in the above conventional image-region classification methods. That is, characters present in a white background in the original image can be classified to be character image parts in the image-region classification methods and thus are processed in a manner appropriate to character images. However, it is technically difficult to classify, to be character images, characters present in a halftone background (the term 'characters present in a halftone background' will be referred to as 'in-halftone characters', hereinafter) and characters present in a color background. As a result, such characters are not classified so that the characters are processed in a manner as if the relevant image parts were not character images but were mixed-category images or a part of a picture image such as a halftone image or a photograph image. Thus, the characters may not be processed in a manner appropriate to character images.

A processing manner not appropriate to character images is, for example, a smoothing process in the above Paper 2. In addition to performing such a smoothing process, it is also possible to perform an edge-enhancement process after performing the smoothing process on such an image region including character image parts for a purpose of improving resolution of an image on a finally obtained copy. However, it is difficult to make compatible resolution improvement and Moire elimination to be achieved in processing in-halftone character image parts. Moire may appear as a result of interference occurring between spatial periodicities of a halftone relevant to an original halftone-printed image and dither provided by an apparatus processing the original image. Such Moire has to be suppressed from appearing so as to improve image quality in an image of a finally obtained copy.

Therefore, if characters present in a white background in an original image are assumed to be classified, in the image-region classification process, as character images and thus are processed appropriately to character images to be reproduced as to be high quality images, it is required that image parts included in a region having been classified, in the image-region classification process, as to be picture images are filtered so as to:

(1) improve image quality of in-halftone characters and characters in a color background;

(2) suppress Moire from appearing from a halftone-printed original image; and (3) make compatible edge enhancement and smooth tone variation for a photograph original image. However, almost no attempt has been made to improve image quality of in-halftone characters and characters in a color background in the prior art.

The present applicant disclosed a digital color image representing apparatus in Japanese Laid-Open Patent Application No.6-131455. The apparatus is effective to improve image quality of characters in a white background, in-halftone characters and characters in a color background in a reproduced image and also to effectively suppress Moire from appearing in the reproduced image. It is assumed that the apparatus does not have means for carrying out a image-region classification process such as mentioned above and thus may process characters in a white background without these characters previously being classified so as to distinguish these characters from other kinds of images. Thus, in the apparatus, a manner in which an original image is filtered for smoothing is controlled so as to be adapted to characteristics of image parts in each original image.

Japanese Laid-Open Patent Application No.61-157162 discloses an image processing apparatus. The apparatus detects edge parts in an original image so as to determine that the detected edge parts are those of character regions, and performs an edge-enhancement process on the character regions. The apparatus performs a smoothing process on halftone regions in the original image. If in-halftone characters are processed in such a method, since an edge amount is large in a periphery of each character, that is, since tone gradient is steep there, even if the character is present in a halftone background and thus the periphery consists of a halftone image part, the above edge-part detection detects the periphery as to be an edge part. Thus, the apparatus enhances the edge amount in the periphery although the periphery consists of the halftone image part. As a result, since the smoothing process is thus not performed on the periphery consisting of the halftone image part, the halftone dots present in the periphery are left without being smoothed. Thus, jags resulting from the halftone dots are left without being smoothed in the periphery of the character in a reproduced image and degrade image quality of the reproduced image.

SUMMARY OF THE INVENTION

An object of the present invention is to provide a spatial-filtering unit for reproducing in-halftone characters of high image quality, characters in a color background, halftone-printed images and photograph images.

In order to achieve the above object, a spatial-filtering unit according to the present invention includes two filters. A first filter performs a smoothing process on an original image and after that, a second filter performs an edge-enhancement process thereon. A manner of the edge-enhancement process is varied so as to be adapted to edge amounts of currently processed pixels. The edge amounts are degrees as to how steep tone gradients are. The smoothing process smooths periodic tone oscillation, having spatial frequency more than 100 lines/inch (3.9 line-pairs/mm), present in the original image. Thus, Moire is prevented from appearing. The adaptive edge-enhancement process makes in-halftone characters and characters in a color background be thin and sharp in their outlines. Further, the adaptive edge-enhancement process enhances edge of edge parts present in the original image if it is a picture image including a photograph image.

It is preferable for the unit to have means for performing an image-region classification process so as to remove a region of characters in a white background from an original image before the first and second filters perform the relevant processes on the original image. The thus-removed region may be processed in a manner appropriate to character images in accordance with the prior art. Thus, outline edges of the characters in the white background are effectively enhanced so that the sharpness of the characters' outlines is improved. Further, the characters in the white background are prevented from undergoing the smoothing process. Thus, it is not necessary to make the first filter for smoothing be an adaptive smoothing filter but a smoothing filter having a fixed function can be used as the first filter. A region that remains after the region of characters in the white background is removed from the original image is a picture region on which the relevant processes are performed by the first and second filters. The picture region may include in-halftone characters, characters in a color background, halftone-printed images and photograph images.

As a result, it is possible to appropriately reproduce in-halftone characters, characters in a color background, halftone-printed images and photograph images, high image quality being thus achieved in the thus-reproduced images if any sorts of printing means are used to finally print out the images.

It is preferable that an original image in the form of a reflectance-linear signal is used to undergo the smoothing process performed by the first filter. After undergoing the smoothing process, a resulting image is converted into an image in the form of a density-linear signal and then undergoes the adaptive edge-enhancement process performed by the second filter. The reflectance-linear signal is advantageous for removing Moire contained in the signal due to a property of the signal. Further, the density-linear signal is advantageous for enhancing edge amounts so as to realize thin characters and sharp outlines of characters in a reproduced image from either in-halftone characters or characters in a color background in an original image.

Such a serial execution of the smoothing process and the adaptive edge-enhancement process make it easy that means for converting the form of an image from the reflectance-linear signal into the density-linear signal is inserted between the first and second filters. If a smoothing unit and an edge-enhancement unit are connected in parallel as shown in FIG. 1 of the above Japanese Laid-Open Patent Application No.61-157162, a structure should be complicated to obtain the above-mentioned advantages due to the signal-form conversion as a result of modifying the structure shown in FIG. 1.

It is preferable that the first filter has a property to smooth halftone dots present in an original image.

It is preferable that the second filter has an edge-calculating filter and an edge-enhancement filter. The edge-calculating filter detects positions at which edges are present and the edge enhancing filter enhances spatial frequencies in a high spatial frequency band among spatial frequency components the edges have. The edge calculating filter calculates edge amounts of image parts in a given image, the edge amounts being degrees as to how steep tone gradients are. The edge-calculating filter has characteristics to increase calculation results for sorts of image parts having characteristics such as those of characters present in the given image. The edge-enhancement filter appropriately enhances edges depending on the thus-obtained edge-amounts. Specifically, the edge-calculating filter and the edge-enhancement filter have different spatial-frequency response characteristics so that the edge-enhancement filter has a high response especially for an image part having a high spatial-frequency in the given image while the edge-calculating filter has a high response especially for an image part having a low spatial-frequency. The high response of the edge-enhancement filter especially for an image part having a higher spatial-frequency is effective to improve sharpness at outlines of characters in the given image. The high response of the edge calculating filter especially for an image part having a low spatial-frequency is effective to suppress edges of halftone dots present in a halftone background of the characters from being enhanced. Generally speaking, a spatial frequency of characters having an ordinary thickness is lower than one of halftone dots having a ordinary density. The above-mentioned low frequency corresponds to the spatial frequency of the characters. Thus, the halftone background does not undergo the edge-enhancement process and only the outlines of the characters undergo the edge enhancement process. Thus, in-halftone characters are effectively processed and thus are reproduced ideally.

With regard to characters in a color background, if the color background in an original image consists of a continuously painted color area or the like, the edge-calculating filter outputs no significant edge amounts as a result of calculation for the color background since the continuously painted color area has generally no significant edge amounts. As a result, the edge-enhancement filter substantially only enhances edges of character image parts among image parts constituting characters in the color background. Thus, characters in the color background are also effectively processed and thus are reproduced ideally.

Further, the edge-calculating filter may be a filter for calculating edge amounts as a result of obtaining a difference between pixels having the maximum level and the minimum level, the pixels being pixels among pixels consisting of a currently processed pixel and pixels surrounding the currently processed pixel in a given image. Alternatively, the edge-calculating filter is a filter for calculating edge amounts as a result of obtaining a first derivative of pixel data of a currently processed pixel and pixels surrounding the currently processed pixel.

Other objects and further features of the present invention will become more apparent from the following detailed description when read in conjunction with the accompanying drawings.

BRIEF DESCRIPTION OF THE DRAWINGS

FIG. 1 shows a block diagram of a spatial-filtering unit in a first embodiment of the present invention;

FIG. 3 shows an example of a spatial filter for enhancing outline edges of characters, the characters being those present in a white background, the spatial filter being applicable to the edge-enhancement filter shown in FIG. 1;

DESCRIPTION OF PREFERRED EMBODIMENTS

Figure 2A:
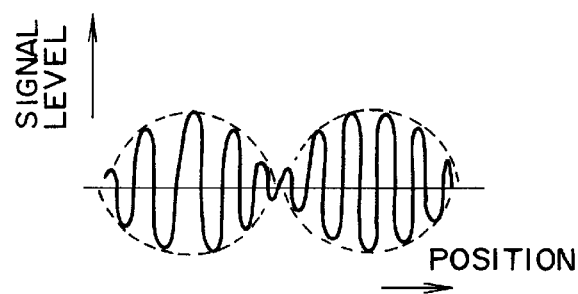
FIGS. 2A, 2B, 2C and 2D illustrate effects of smoothing a reflectance-linear signal and a density-linear signal, FIG. 2B showing tone variation obtained through a smoothing process from the reflectance-linear signal shown in FIG. 2A, FIG. 2D showing tone variation obtained through a smoothing process from the density-linear signal shown in FIG. 2C.
Figure 2B:

With reference to FIG. 1, a spatial-filtering unit in a first embodiment of the present invention will now be described. The spatial-filtering unit includes an image-region classifying unit 1 for classifying a given image into image parts of characters and image parts of non-characters. The classification unit 1 outputs a signal for instructing whether currently processed image parts belong to the character image parts or the non-character image parts. The spatial-filtering unit further includes an edge-enhancement unit 2 for enhancing sharpness of characters. A process the edge-enhancement unit 2 performs is a process appropriate to, particularly, the character image parts, that is, characters in a white background. The spatial-filtering unit further includes a smoothing unit 3 for smoothing halftone dots so as to prevent Moire from appearing. Smoothing halftone dots means removing periodic tone oscillations present along a given image due to the halftone dots. The spatial-filtering unit further includes an adaptive edge-enhancement unit 4 for enhancing contractivity of in-halftone characters and characters in a color background and enhancing sharpness of outline-edges of objects present in picture images. Processes the smoothing unit 3 and the adaptive edge-enhancement unit 4 perform are processes appropriate to, particularly, the non-character image parts, that is, in-halftone characters, characters in a color background, halftone-printed images and photograph images. The spatial-filtering unit further includes a selecting unit 5 for, in accordance with the signal output by the image-region classification unit 1, selecting one of signals output by the edge-enhancement unit 2 and output by the adaptive edge-enhancement unit 4 appropriate to currently processed image parts.

It is assumed that input image data supplied to the spatial-filtering unit shown in FIG. 1 is 400-dpi, 8-bit (256-tone), reflectance-linear data. The reflectance-linear data refers to data linear to light intensities received as a result of being reflected by an original image. Further, it is defined that a value 255 of the image data refers to data corresponding to white in the original image and a value 0 of the image data refers to data corresponding to black therein. Image data obtained through a scanner including a CCD from a halftone-printed original image may result in Moire. The Moire occurs as a result of interference between halftone periods present in the original image and sampling periods due to characteristics of ordinary image processing processes. Such Moire may greatly degrade image quality of the original image. Generally speaking, smoothing by filtering is effective to prevent Moire from occurring and it is advantageous that reflectance-linear data is used in the smoothing process.

Figure 2C:
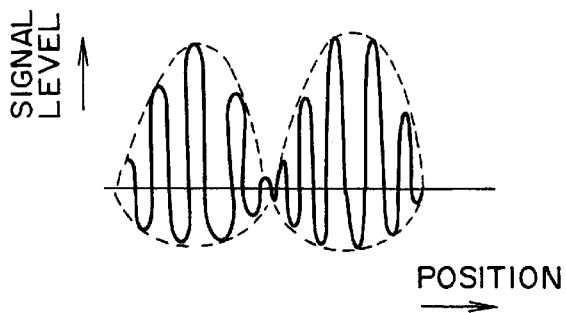
Figure 2D:
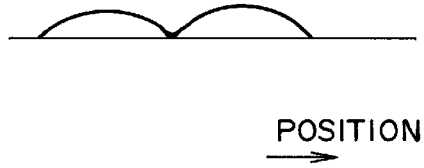

With reference to FIGS. 2A, 2B, 2C and 2D, generally speaking, signal level variation due to halftone tone oscillation is distorted in density-linear data shown in FIG. 2C, while that is not distorted in reflectance-linear data shown in FIG. 2A. Therefore, it is easier to remove the oscillation using the reflectance-linear signal in comparison to using the density-linear signal. The reflectance-linear signal and the density-linear signal have been obtained from the same original halftone-printed image. Generally speaking, the reflectance-linear signal is a signal which is at first obtained as a result of reading-in the original image through an image scanner. The density-linear signal is a signal which is obtained as a result of converting the thus obtained reflectance-linear signal. The density-linear signal is used in a process of printing-out the corresponding image. Since the above conversion is a non-linear conversion, periodic variation of the signal level due to presence of halftone dots in the image is distorted in the conversion. In fact, as shown in FIG. 2D, tone oscillation is left in the density-linear signal even after undergoing the smoothing process. The thus-left tone oscillation may result in not only Moire but also in an unexpected color change. On the other hand, if the reflectance-linear data shown in FIG. 2A is used, data shown in FIG. 2B having almost no tone oscillation can be obtained. Therefore, the reflectance-linear signal is used as input image data of the spatial-filtering unit shown in FIG. 1.

The image-region classification unit 1 may have a structure according to a segmentation method for documents containing text/picture disclosed in the above-mentioned Paper 2. The unit 1 determines characters in a white background to be character image parts, and determines each of in-halftone characters and characters in a color background to be non-character image parts, that is, picture image parts. It is assumed that the color background of 'the characters in a color background' is an area having brightness resulting in a rather low reflectance-linear data level. Various structures, which basically classify characters in a white background from a given image, may also be used as a structure of the image-region classification unit 1 other than that according to the method disclosed in the Paper 2.

Figure 4:
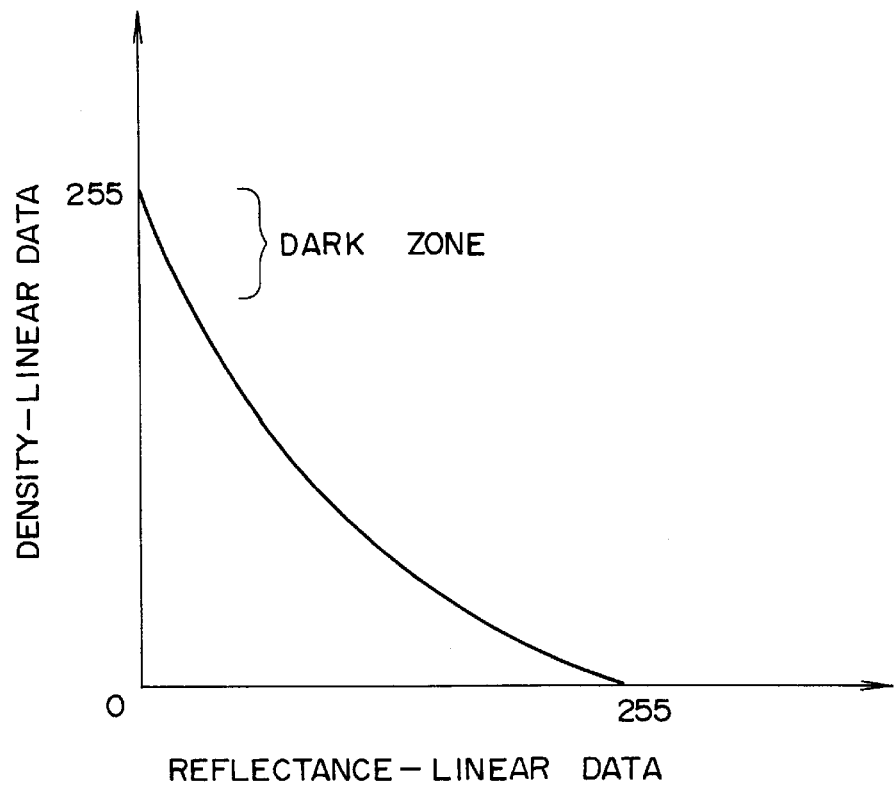
FIG. 4 illustrates signal conversion characteristics for converting a reflectance-linear signal into a density-linear signal.

The edge-enhancement unit 2 enhances sharpness of characters in a white background and uses, for example, a digital spatial filter such as that shown in FIG. 3. The digital spatial filter shown in FIG. 3 is the same as that shown in FIG. 11 of the above-mentioned Paper 2. See description regarding FIG. 11 in the Paper 2 for details of the filter. Further, it is possible to provide a table conversion process to be performed on given image data before making the image data pass through the digital spatial filter. See FIG. 4 for characteristics of the table conversion process, the table conversion process converting the reflectance-linear signal into a density-linear signal. The density-linear signal is a signal carrying density-linear data having values linear to densities of a relevant image and has a value 0 for white in the image and a value 255 for black therein.

Figure 5:
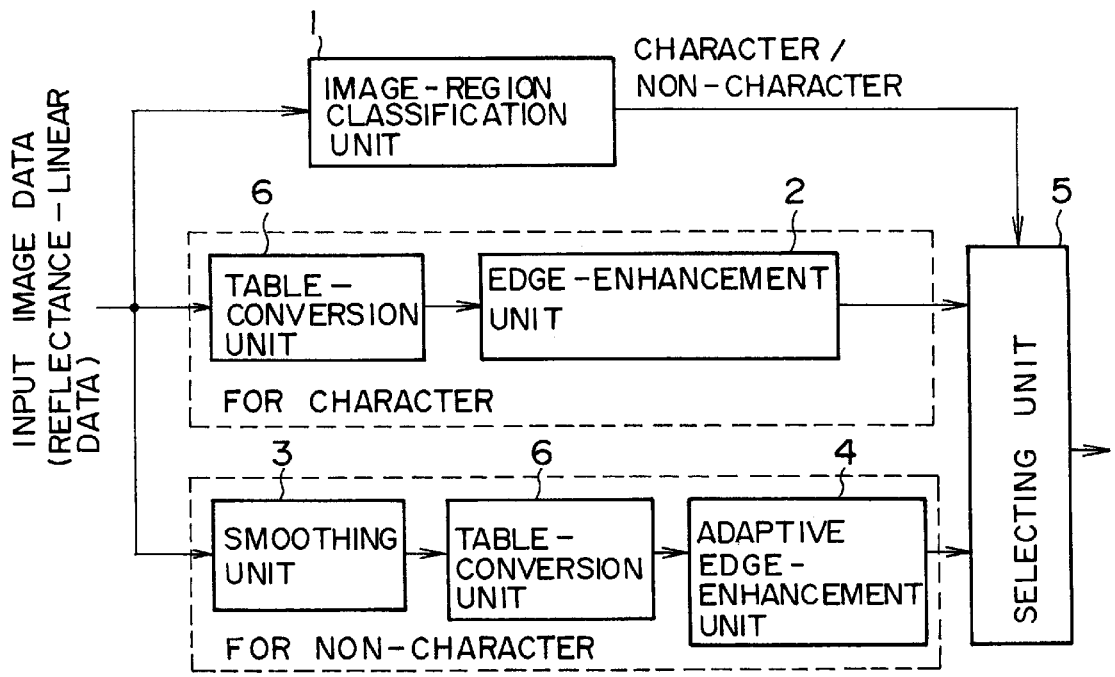
FIG. 5 shows a block diagram of a spatial-filtering unit in a second embodiment of the present invention, the unit using a density-linear signal for an edge-enhancement process.

With reference to FIG. 5, a spatial-filtering unit in a second embodiment of the present invention will now be described. In the filtering unit shown in FIG. 5, each of edge-enhancement process by the edge-enhancement unit 2 and adaptive edge-enhancement process (which will be described later) by the adaptive edge-enhancement unit 4 is performed on a density-linear signal. Specifically, table conversion units 6 are provided before the edge-enhancement unit 2 and also before the adaptive edge-enhancement unit 4, respectively, as shown in FIG. 5.

Figure 6A:
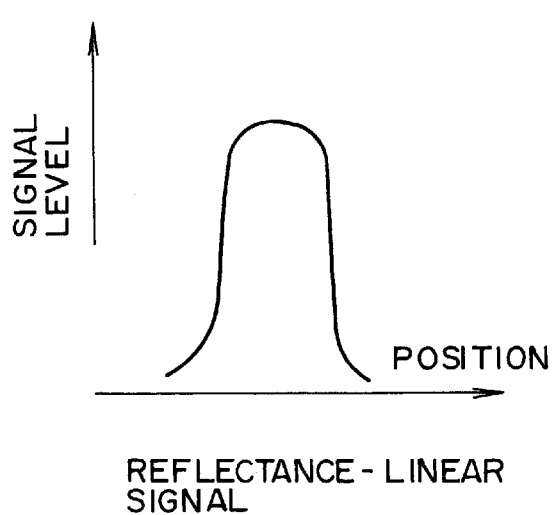
FIGS. 6A and 6B illustrate effects of performing edge-enhancement process on a reflectance-linear signal and a density-linear signal.
Figure 6B:
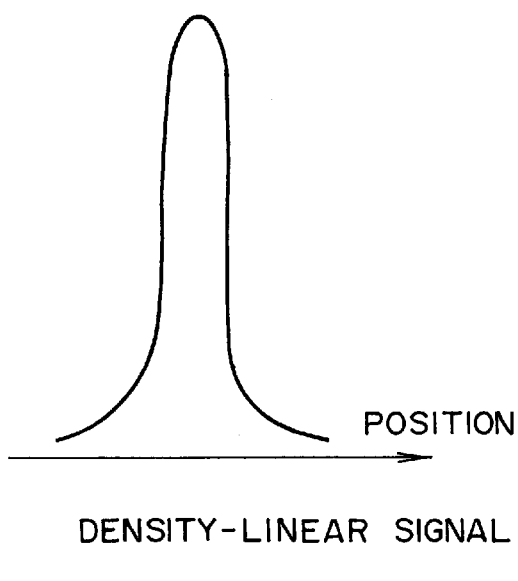

A dark zone in an image results in a low level in a relevant reflectance-linear signal. However, after the reflectance-linear signal is converted into a density-linear signal, the low level in the reflectance-linear signal is a high level in the density-linear signal, due to property of the conversion, as shown in FIGS. 6A and 6B. Thus, at the dark zone such as that shown in FIG. 4 of a relevant image, signal-level variation amounts are increased in the density-linear signal in general. As a result, characters, consisting of ordinarily black areas, are thin and sharp in a reproduced image. This advantage is especially enhanced if a printing unit connected after the spatial-filtering unit shown in FIG. 5 for printing out a reproduced image has characteristics, such as those of electro-photography, due to which characteristics dots present in an original image are spread and thus become continuous with one another.

A serial connection of the smoothing unit 3 and the adaptive edge-enhancement unit 4 as shown in FIG. 5 make it easy that means for converting of the form of image signal from a reflectance-linear signal into a density-linear signal is inserted between the units 3 and 4. Thus, modification from the structure shown in FIG. 1 to the structure shown in FIG. 5 as a result of inserting the table conversion units 6 is easy to be performed. As a result, a reflectance-linear signal advantageous for the smoothing process is used for the smoothing process and a density-linear signal advantageous for the edge-enhancement process is used for the edge-enhancement process as shown in FIG. 5. As described above, if a smoothing unit and an edge-enhancement unit are connected in parallel as shown in FIG. 1 of the above Japanese Laid-Open Patent Application No.61-157162, a structure should be complicated to obtain the above-mentioned advantages due to the signal-form conversion as a result of modifying the structure shown in FIG. 1. In fact, in the parallel block arrangement shown in FIG. 1 of the application Ser. No.61-157162, two table conversion units are necessary, one for converting a reflectance-linear signal into a density-linear signal before an edge enhancer b and another for converting a density-linear signal into a reflectance-linear signal after the edge enhancer b, for example.

Figure 7:
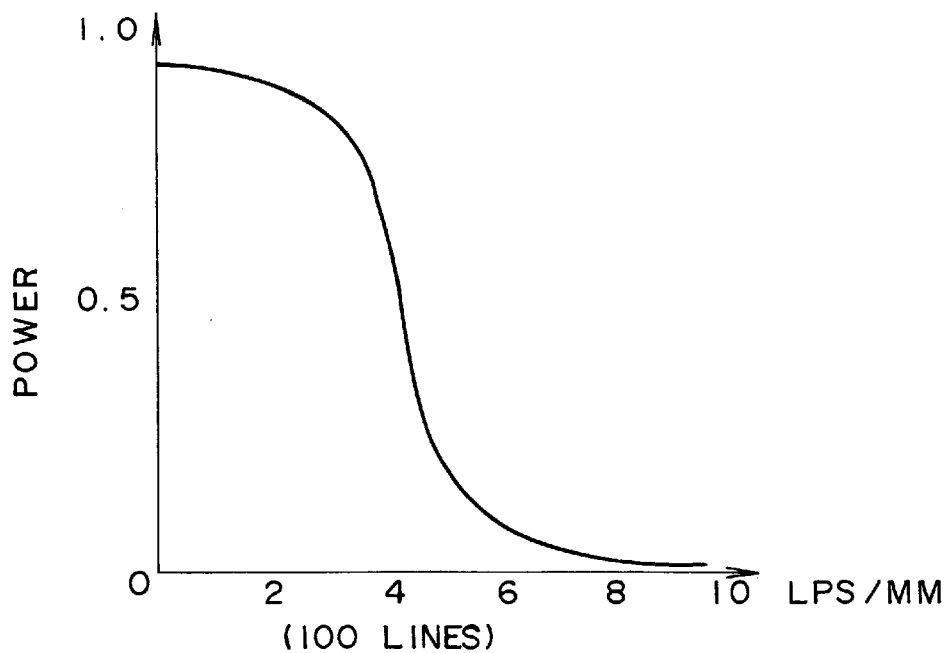
FIG. 7 shows characteristics of a smoothing filter shows in FIGS. 1 and 5.

The smoothing unit 3 shown in FIGS. 1 and 5 performs the smoothing process on an image read-in through a scanner. The smoothing unit 3 includes a smoothing filter having a cut-off spatial frequency around 100 lines per inch and thus generally removes halftone tone-oscillations having spatial frequencies more than 100 lines per inch (3.9 line-pairs per millimeter) and leaving those as they are having spatial frequencies less than the cut-off frequency. See FIG. 7 for characteristics of the smoothing filter. As a result of making a signal carrying data of an original image pass through the smoothing filter, Moire due to the halftone tone-oscillations present in the original image is prevented from occurring. Further, the smoothing unit 3 having the above characteristics also removes noise present in photograph original images.

The adaptive edge-enhancement unit 4 shown in FIGS. 1 and 5 enhances contractivity of in-halftone characters and characters in a color background and enhances sharpness of outline-edges of objects present in picture images including halftone-printed images and photograph images, sharpness of the images being thus enhanced. Other regions, that is, regions including no significant edge amounts, in a given image, are left without undergoing a significant edge-enhancement process. Thus, a reproduced image can be obtained such that smooth expressions are obtained from the image at regions corresponding to the above other regions.

Figures 8, 9:
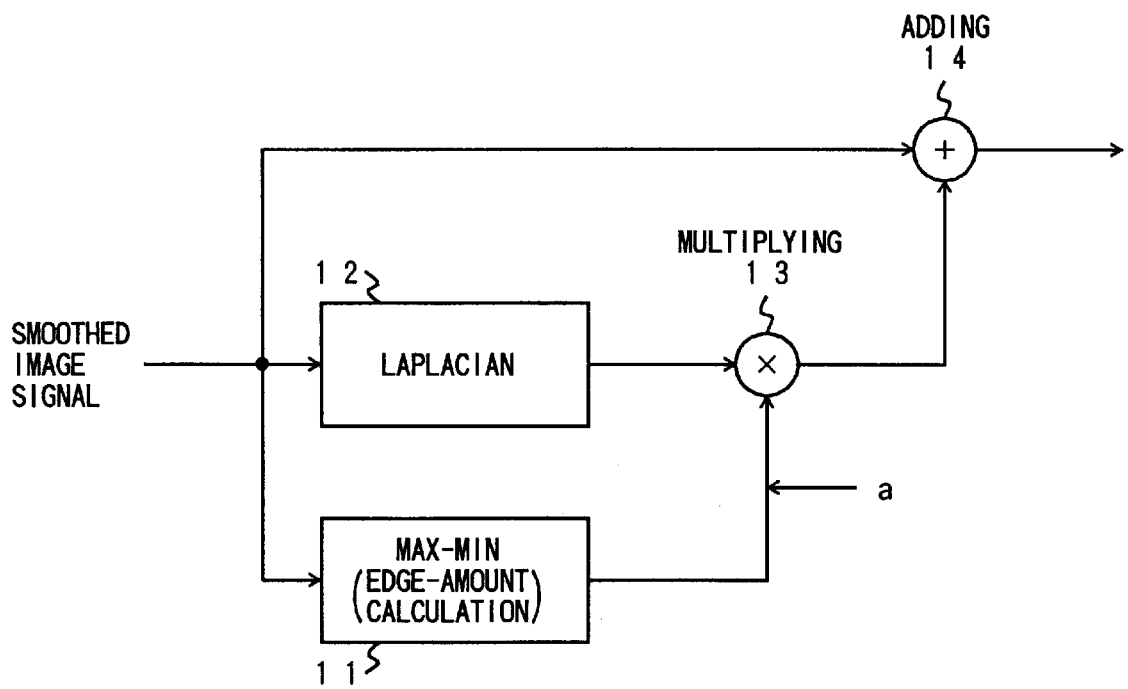
FIG. 8 shows a first example of an adaptive edge-enhancement unit shown in FIGS. 1 and 5.
FIG. 9 shows an example of a Laplacian (second-derivative operator) applicable to one shown in FIG. 8.

With reference to FIG. 8, a first example of a structure applicable to the adaptive edge-enhancement unit 4 will be described. An edge-amount calculating filter (Max-Min) 11 in the structure calculates edge amounts such as those described above in a given image and includes, for example, a 3×3 mask. The 3×3 mask calculates a level difference between the maximum level and the minimum level among levels of relevant 3×3 pixels consisting of a currently processed pixel at the center thereof and pixels surrounding the currently processed pixel. Thus, an edge amount of the currently processed pixel and pixels surrounding the currently processed pixel is obtained. The thus obtained level difference is divided by a predetermined constant so that a level difference is normalized into a level variable in a range between 0 and 1. Thus, the edge-amount calculating filter 11 outputs a value variable in the 0–1 range for the currently processed pixel.

With reference to FIG. 9, a Laplacian 12 shown in FIG. 8, a digital spatial filter, acting as an edge-enhancement filter, will now be described. This filter is the same as the filter disclosed in FIG. 27 (1) of 'Fineness Processing Technology', written by Jou Suzuki, pages 107–139 of a publication 'Color Hardcopy Image Processing Technology', Triceps WS 114, published by Ken Kawauchi, Triceps, Inc., on May 25, 1990, printed by Showa Printing Company. See description regarding the FIG. 27 (1) in the publication for detail of the filter. The filter multiplies a level of a currently processed pixel by 4 and obtains a difference between the thus 4-times multiplied level and total of levels of 4 pixels adjacent leftward, rightward, upward and downward to the currently-processed pixel. By the above calculating process, a change rate of tone gradient along each of a main-scan direction and a sub-scan direction is obtained. Specifically, if there is no tone gradient, that is, tone is uniform over an image part, no significant value is output by the Laplacian 12. If a tone gradient is uniform over an image part including the above-mentioned five pixels, that is, for example, if the image part is positioned midway of an edge, also no significant value is output by the Laplacian 12. If a tone gradient is varying in an image part, that is, if an edge is beginning in the image part or if an edge is finishing in the image part, a significant value is output by the Laplacian. In such a case, a negative value is output for an edge-beginning point and a positive value is output for an edge-finishing point.

Thus, an edge-enhancing coefficient is produced for an edge consisting of the currently processed pixel and the other 4 pixels. The enhancement of the edge is, in the specification and claims of the present application, referred to as an operation to control levels of relevant pixels so that sharpness of the edge is enhanced. For this purpose, a tone difference between inside and outside of an edge is increased at an image part located in close proximity to the edge. In fact, as a result of the above-mentioned operations performed by the Laplacian, image data input to the adaptive edge-enhancement unit 4 having the structure shown in FIG. 8 is modified so that a tone level is made locally lowered at the edge beginning point and a tone level is made locally raised at the edge finishing point. The structure of the Laplacian 12 is not limited to that shown in FIG. 9 and various structures performing similar functions may be applied to the Laplacian 12.

A multiplying device 13 shown in FIG. 8 multiplies outputs of the Laplacian and the above-described edge-amount calculating filter (Max-Min) 11 with one another. Thus, an edge-enhancement coefficient produced by the Laplacian 12 is controlled due to the edge amount around the currently-processed pixel. An adding device 14 adds a signal output by the multiplying device 13 with a signal smoothed by the smoothing unit 3 and input to the adaptive edge-enhancement unit 4 having the structure shown in FIG. 8. Thus, the edge consisting of the currently-processed pixel and adjacent and surrounding pixels is effectively enhanced using the edge-enhancement coefficient controlled by the calculated edge amount. If the adaptive edge-enhancement unit 4 shown in FIG. 5 has the structure shown in FIG. 8, the signal input to the adding device 14, the Laplacian 12 and the edge-amount calculating filter 11 is a signal output by the table conversion unit 6.

The above-described Laplacian 12 and edge-amount calculating filter (Max-Min) 11 have characteristics such that each of a value output by the Laplacian 12 and a value output by the edge-amount calculation filter 11 varies as a spatial frequency of an image part around the currently processed pixel, as follows: The Laplacian 12 has a large output value especially for an image part having a high spatial-frequency in a frequency range while the edge-amount calculating filter 11 has a large output value especially for an image part having a low spatial-frequency lower than the above frequency range. The above frequency range is one between 6–8 line-pairs per millimeter, that is, 150–200 lines per inch. Having a large output value of the Laplacian 12 for an image part having such a high spatial-frequency is effective to increase sharpness of outlines of characters.

Having a large output value of the edge-amount calculating filter 11 especially for an image part having such a low spatial-frequency is effective to suppress edges of halftone dots present in a halftone background of the characters from being enhanced. In fact, generally speaking, a spatial frequency of characters having an ordinary thickness is lower than one of halftone dots having an ordinary density. The above-mentioned low frequency generally corresponds to the spatial frequency of the characters. Thus, for image parts corresponding to the characters, an output value of the edge-amount calculating filter 11 is relatively high and thus the edge-enhancement coefficient is increased. As a result, sharpness of the characters are effectively improved. On the other hand, for an image part included in the halftone background, an output value of the edge-amount calculating filter 11 is relatively low and thus the edge-enhancement coefficient is reduced. As a result, enhancement of the edges present in the halftone background, that is, enhancement of the edges of halftone dots is effectively suppressed.

The generating of the edge-enhancement coefficients by the Laplacian 12 has characteristics such that the Laplacian has significant output values for the range of all possible spatial frequencies (0–10 line-pairs per millimeter) for image parts having edges therein. Thus, it is possible to obtain high image quality for in-halftone characters. In particular, an edge-enhancement operation such that edges having high spatial frequencies are enhanced is effective to improve sharpness of characters. Thus, it is preferable that the Laplacian has characteristics so as to achieve the above-mentioned edge-enhancement operation. Fine adjustment of a coefficient of the edge amounts calculated by the edge-amount calculating filter 11, that is, how large of coefficients of the calculated edge amounts should be used to directly control the edge-enhancement coefficients produced by the Laplacian, is possible by the following way: Appropriate table-converting means is inserted at a position between the calculating filter 11 and multiplying device 13, pointed out by a symbol 'a' shown in FIG. 8. The table-converting means converts, one by one, values output by the calculating filter 11 in accordance with a conversion table.

Thus, by each of the spatial-filtering units shown in FIGS. 1 and 5, tone oscillations due to halftone dots present in a halftone-printed image part are smoothed. On-halftone characters are processed so that tone oscillations due to halftone dots present in a halftone background of the in-halftone characters are smoothed. Further, edges of the halftone dots are not treated as edges to be enhanced and edges of characters even present in the halftone background are enhanced. As a result, a reproduced image can be obtained, in which sharpness of image parts which is desired is enhanced and undesired tone oscillations present in image parts are removed.

Figures 10, 11:
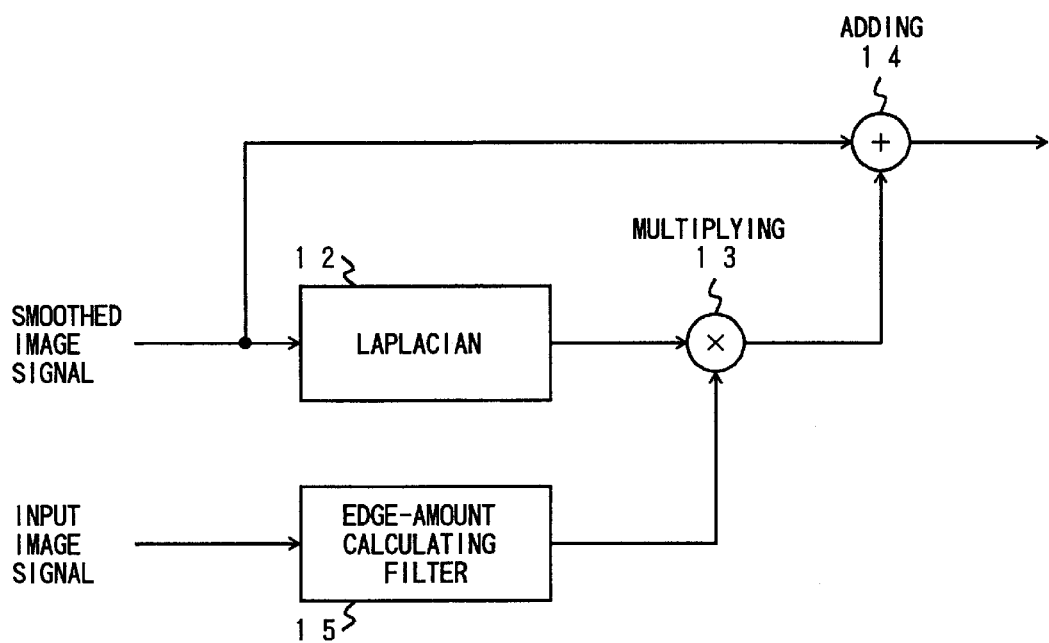
FIG. 10 shows a second example of an adaptive edge-enhancement unit shown in FIGS. 1 and 5.
FIG. 11 shows an example of a spatial filter applicable to an adaptive the edge-enhancement unit shown in FIG. 10.

With reference to FIG. 10, a second example of a structure applicable to the adaptive edge-enhancement unit shown in FIGS. 1 and 5 will now be described. The structure shown in FIG. 10 is the same as that shown in FIG. 8, except for another edge-amount calculating filter 15 provided instead of the edge-amount calculating filter 11 used in the structure shown in FIG. 8. With reference to FIG. 11, a specific example of the edge-amount calculating filter 15 will now be described. The edge-amount filter shown in FIG. 11 performs a first-derivative filtering process on tone levels of a pixel set consisting of a currently processed pixel and pixels surrounding the currently processed pixel. That is, the filter shown in FIG. 11 obtains an absolute value of a first derivative of an input image data I, indicating the tone levels of the above-mentioned pixel set, so as to obtain a tone gradient along a main-scan direction and obtains an absolute value of a first derivative of the input image data I so as to obtain a tone gradient along a sub-scan direction. The filter then obtains, as an edge amount, the maximum value of the thus-obtained absolute values, that is, the maximum value of absolute values of tone gradients along the two directions. A function f(x) shown in FIG. 11 is a function to normalize the thus-obtained edge amount into a value, the possible maximum value of which is 1. For further detail of the expression shown in FIG. 11, see equation 1 and the description regarding the equation disclosed in the above-mentioned Japanese Laid-Open Patent Application No.61-157162. Characteristics of the Laplacian 12 and edge-amount calculating filter 15 depending on spatial frequencies of relevant image parts are similar to those of the Laplacian 12 and edge-amount calculating filter 11 described for the structure shown in FIG. 8. That is, the Laplacian 12 has a large output value especially for an image part having a high spatial-frequency in the frequency range while the edge-amount calculating filter 15 has a large output value especially for an image part having a low spatial-frequency lower than the above frequency range. The structure of the edge-amount calculating filter 15 is not limited to that shown in FIG. 11 and various structures performing similar functions may be applied to the edge-amount calculating filter 15.

Further, the present invention is not limited to the above-described embodiments, and variations and modifications may be made without departing from the scope of the present invention.

What is claimed is:

1. A spatial-filtering unit for spatially-filtering image data representing tone levels of an image, said spatial-filtering unit comprising:

first filtering means for performing on the image data in the form of a reflectance-linear signal a smoothing process by which tone oscillations formed by the tone levels are suppressed, the first filtering means having an output providing smoothed image data, the reflectance-linear signal representing tone levels linear to reflectance of light reflected by an original image;

second filtering means for performing on the smoothed image data which has previously undergone said smoothing process an adaptive edge-enhancement process which enhances sharpness of edges constituting parts having steep tone gradients in the image, said adaptive edge-enhancement process depending on a combination of a resolution of input image data and a coefficient of said second filtering means so that said second filtering means may selectively enhance portions of said image having steep tone gradients on a half-tone background;

and data-form converting means connected between said first filtering means and said second filtering means for converting a first signal in the image data in the form of the reflectance-linear signal to a density linear signal prior to said adaptive edge-enhancement process, said density linear signal representing tone levels linear to densities of the original image.

2. The spatial-filtering unit according to claim 1, further comprising image-region classification means for classifying the image into character regions and other regions, the character regions being regions comprising characters in a white background, and said smoothing process and said adaptive edge-enhancement process being performed on said other regions.

3. A spatial-filtering unit for spatially-filtering image data representing tone levels of an image, said spatial-filtering unit comprising:

first filtering means for smoothing the image data in the form of a reflectance-linear signal so as to substantially suppress tone oscillations formed by the tone levels, the first filtering means having an output providing smoothed image data;

an edge determining unit for determining edge amounts of a character based upon a predetermined spatial frequency below a spatial frequency of a half-tone background;

second filtering means for performing, on the smoothed image data which has previously undergone said smoothing process, an adaptive edge-enhancement process which enhances sharpness of edges constituting parts having steep tone gradients in the image, said adaptive edge-enhancement process depending on a combination of the edge amounts and a predetermined spatial frequency filtering, said edge amounts indicating steepness of the tone gradients of tone levels on the half-tone background being selectively enhanced by said second filtering means;

and data-form converting means connected between said first filtering means and said second filtering means for converting a first signal in the image data in the form of the reflectance-linear signal to a density linear signal prior to said adaptive edge-enhancement process, said density linear signal representing tone levels linear to densities of the original image.

4. The spatial-filtering unit according to claim 1, wherein:

said first filtering means removes tone oscillations due to halftone dots present in the image; and said second filtering means enhances edges other than edges due to the halftone dots.

5. The spatial-filtering unit according to claim 1, wherein:

said second filtering means comprises:

edge-detecting means for detecting edges and boundaries of characters present in the image; and edge-enhancement means for enhancing the edges detected by said edge-detecting means.

6. The spatial-filtering unit according to claim 5, wherein said edge-detecting means comprises a spatial-frequency band-pass filter for detecting edges of the image having spatial frequencies corresponding to those of ordinary characters.

7. The spatial-filtering unit according to claim 5, wherein said edge-enhancement means enhances high spatial frequency edges.

8. The spatial-filtering unit according to claim 1, wherein:

said second filtering means comprises:

an edge-amount calculating filter for calculating the edge amounts; and an edge-enhancement filter for enhancing the edges in a manner depending on the edge amounts calculated by said edge-amount calculating filters, said edge-amount calculating filter having large output values for image parts of the image having low spatial frequencies, while said edge-enhancement filter has large output values for image parts of the image having high spatial frequencies higher than said low spatial frequencies.

9. The spatial-filtering unit according to claim 8, wherein said edge-amount calculating filter obtains each of the edge amounts as a result of obtaining a difference between the maximum tone level and the minimum tone level of tone levels of a relevant image part of the image.

10. The spatial-filtering unit according to claim 8, wherein said edge-amount calculating filter obtains a first derivative of the image data so as to obtain the edge amounts.

11. The spatial-filtering unit according to claim 8, wherein said edge-enhancement filter comprises a Laplacian for obtaining a second derivative of the image data.

12. The spatial-filtering unit according to claim 8, further comprising fine-adjustment means for fine adjustment of said coefficient as to the edge amounts to be taken into account by said edge-enhancement filter.

* * * * *